United States Patent [19]

Ma

[11] Patent Number: 5,067,459
[45] Date of Patent: Nov. 26, 1991

[54] FUEL TIMING CONTROL

[75] Inventor: Thomas T. Ma, South Woodham Ferrers, England

[73] Assignee: Ford Motor Company, Dearborn, Mich.

[21] Appl. No.: 576,521

[22] PCT Filed: May 2, 1989

[86] PCT No.: PCT/GB89/00504

§ 371 Date: Oct. 28, 1990

§ 102(e) Date: Oct. 28, 1990

[87] PCT Pub. No.: WO89/11029

PCT Pub. Date: Nov. 16, 1989

[30] Foreign Application Priority Data

May 3, 1988 [GB] United Kingdom ............ 8810420

[51] Int. Cl.$^5$ ............ F02B 3/08; F02D 41/04; F02M 51/00
[52] U.S. Cl. ............ 123/295; 123/435; 123/430
[58] Field of Search ............ 123/295, 425, 430, 435

[56] References Cited

U.S. PATENT DOCUMENTS

| | | | |
|---|---|---|---|
| 4,066,046 | 1/1978 | McAlister | 123/295 |
| 4,079,703 | 3/1978 | Yamane et al. | 123/295 X |
| 4,086,878 | 5/1978 | Eisele et al. | 123/295 X |
| 4,450,795 | 5/1984 | Schaich | 123/295 X |
| 4,463,729 | 8/1984 | Bullis et al. | 123/435 X |
| 4,466,408 | 8/1984 | Cheklich | 123/425 |
| 4,480,620 | 11/1984 | Tange et al. | 123/295 X |

FOREIGN PATENT DOCUMENTS

| | | |
|---|---|---|
| 3212669 | 10/1983 | Fed. Rep. of Germany . |
| 3333513 | 4/1985 | Fed. Rep. of Germany . |
| 3609693 | 10/1986 | Fed. Rep. of Germany . |
| 3627074 | 2/1988 | Fed. Rep. of Germany . |
| 2178646 | 11/1973 | France . |
| 2466623 | 4/1981 | France . |

*Primary Examiner*—Willis R. Wolfe
*Attorney, Agent, or Firm*—Allan J. Lippa; Peter Abolins

[57] ABSTRACT

The invention relates to a spark ignited engine in which charge stratification occurs within the combustion chamber and in which the burn quality of the charge is dependent upon the timing of the instant of introduction of the fuel into the charge. A sensor is provided to produce a signal representative of the burn quality and the fueling timing is controlled in dependence upon the output signal of the sensor so as to optimize the charge stratification within the combustion chamber.

2 Claims, 1 Drawing Sheet

FUEL TIMING CONTROL

BACKGROUND OF THE INVENTION

The present invention relates to the timing of the instant of introduction of fuel into the combustion chamber of a spark ignited internal combustion engine in which the charge is stratified.

The concept of a stratified charge is known from many engine applications as will be described below. The basis of operation is that the overall mixture is too lean to burn correctly but by ensuring an uneven distribution of the fuel in the combustion chamber immediately before the spark, it is possible provide a richer mixture in the immediate vicinity of the spark plug electrodes to guarantee proper ignition, the powerful flame then being able to propagate and ignite the remaining charge which becomes progressively leaner.

One application in which a stratified charge is required is when the quantity of fuel is being used instead of the intake air volume to regulate the engine power output. Here, when operating under part load, there will be excess air and consequently it is essential in view of the overall weakness of the mixture to resort to a stratified charge if proper ignition is to be achieved. This is just one example of a lean burn and others will also come to mind.

Charge stratification also occurs unintentionally when fuel is injected either directly into the cylinder or into the intake port while the inlet valve is open. The fuel injection creates a local concentration of the fuel in the combustion chamber and its timing has been found to be critical. Good performance is achieved if the rich mixture lies within the vicinity of the spark plug electrodes at ignition but not otherwise. Here the charge is meant to be homogeneous but the importance of the injection timing suggests otherwise.

In the case of injection into the intake port, the best performance is produced if injection occurs in a narrow time window while the inlet valve is open but the timing is so critical and the performance is so degraded outside this window that it is generally preferred to time the injection to take place while the intake valve is closed. Here, the efficiency is not optimised but the injection timing is not critical. This ensures a homogeneous mixture but the efficiency is maximised if a weak mixture is burnt while the charge is correctly stratified.

A still further application in which charge stratification is met is in the case of two-stroke engines. A two stroke engine running under part load conditions must resort to charge stratification because the mass of the trapped gas can only be controlled within narrow limits and the regulation of the power is carried out by limiting the fuel supply.

It has been proposed in the case of a two stroke to provide in addition to the transfer passage and the exhaust port a valve controlled fuelling port in which fuel is accumulated during the engine cycle, the fuel being introduced into the combustion chamber at a time when it will not find its way to the exhaust port. As in the case of direct injection into the cylinder of a four stroke engine, the timing of such introduction of the fuel into the combustion chamber is important if advantage is to be taken of the charge stratification to maximise the engine efficiency.

BRIEF DESCRIPTION OF THE DRAWING

The invention described herein will be more fully understood by reading an example of an embodiment which utilized the invention to advantage, referred to as the preferred embodiment, with reference to the single drawing wherein.

DESCRIPTION OF THE PREFERRED EMBODIMENT

Figure 1:
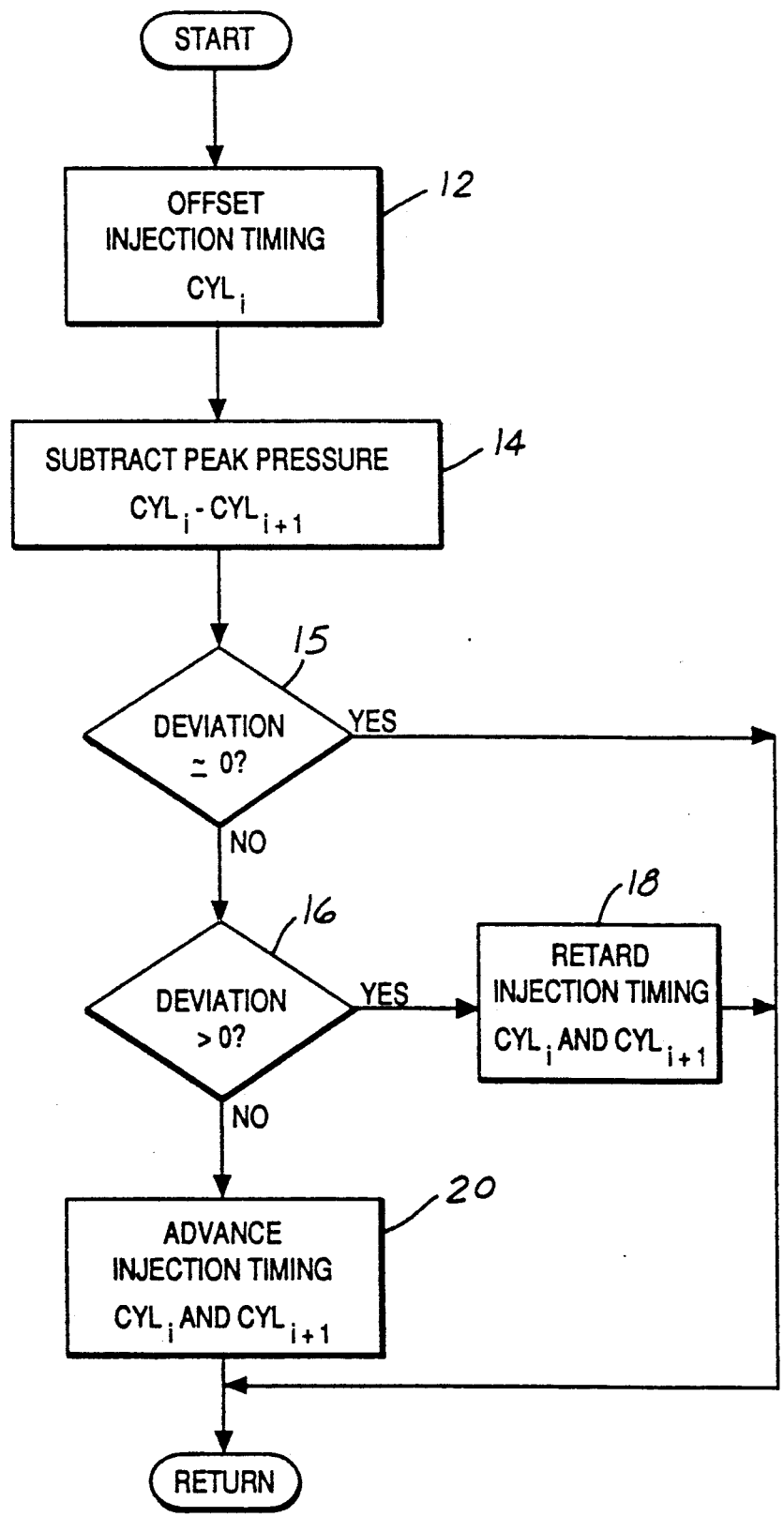
FIG. 1 is a flowchart of various process steps performed in controlling conventional fuel injection of a convention internal combustion engine.

According to the present invention, there is provided a spark ignited internal combustion engine, in which charge stratification occurs within the combustion chamber and in which the burn quality of the charge is dependent upon the timing of the instant of introduction of the fuel into the charge, characterised in that a sensor is provided to produce a signal representative of the burn quality and in that the fuel introduction timing is controlled in dependence upon the output signal of the sensor so as to optimise the charge stratification within the combustion chamber.

It is known that spark timing and mixture strength also affect the burn quality of a charge and sensors are already known, such as ionisation sensors, pressure sensors and optical sensors, for feeding back a signal to the ignition system or the fuelling system to maximise burning efficiency. Any such sensor may be used in the present invention for feedback control of the timing of the fuel introduction.

The burn quality will be maximised at one value of fuel timing and to each side of this local peak, the burn quality will be degraded with changes in timing. The feedback signal must act in a direction to return the timing to its optimum but additional information is required to determine the sense of the deviation from the optimum timing.

To mitigate this problem, it is possible for two cylinders (shown as $CYL_i$ and $CYL_{i+1}$ in FIG. 1) to be fuelled with a given phase difference between them as shown by process step 12 in FIG. 1. In this case the cylinder should at the optimum setting straddle the efficiency peak, as shown by process steps 15, 16, 18 and 20 in FIG. 1, and the sense of any deviation can be determined by subtracting the signals of the two cylinder sensors from one another, as shown by process step 14 in FIG. 1.

Alternative approaches are possible for determining the sense of deviation for example long term trends of the corrections applied may be monitored to determine if the feedback control is aggravating an error instead of correcting it or the same cylinder may have its timing dithered between cycles to obtain analogous data.

Various fuelling and spark timing systems have been proposed in the past which rely on a feedback signal from the combustion chamber. The present invention can utilise similar control systems t control the timing of the introduction of fuel into the combustion chamber and because of the analogy with the known systems, it is believed that the invention will be clear to the person skilled in art from the foregoing comments without the need for more detailed description.

I claim:

1. A spark ignited internal combustion engine, in which charge stratification occurs within the combustion chamber and in which the burn quality of the charge is dependent upon the timing of the instant of introduction of the fuel into the charge, comprising:
- a sensor provided for each cylinder to produce a signal representative of burn quality in each cylinder;
- timing means for controlling the fuel introduction timing in dependence upon the output signal of each sensor so as to optimize the charge stratification within the combustion chamber; and
- means for indicating a sense of deviation of the fueling timing from its optimum setting by fueling two of the cylinders of the engine with a given phase difference between them and subtracting the signals from the individual sensors associated with the cylinders from one another to indicate the sense of deviation of the fueling timing from its optimum setting and adjusting the fueling timing in dependence upon the sense of deviation.

2. An engine as claimed in claim 1, wherein the sensor for producing a signal indicative of burn quality is an ionisation sensor, a pressure sensor or an optical sensor disposed within the combustion chamber.

* * * * *